US009225255B2

(12) United States Patent
Permuy

(10) Patent No.: US 9,225,255 B2
(45) Date of Patent: Dec. 29, 2015

(54) POWER SUPPLY SYSTEM, COMPRISING A CONVERTER CONNECTED TO A NETWORK AND A TRANSFORMER CONNECTED IN PARALLEL RELATIVE TO THE CONVERTER TO LIMIT THE HOMOPOLAR CURRENT, AND A DRIVE CHAIN COMPRISING SUCH A POWER SUPPLY SYSTEM

(71) Applicant: GE Energy Power Conversion Technology Ltd., Rugby (FR)

(72) Inventor: Alfred Permuy, Rueil Malmaison (FR)

(73) Assignee: GE Energy Power Conversion Technology LTD, Warwickshire (GB)

( * ) Notice: Subject to any disclaimer, the term of this patent is extended or adjusted under 35 U.S.C. 154(b) by 173 days.

(21) Appl. No.: 13/921,596

(22) Filed: Jun. 19, 2013

(65) Prior Publication Data
US 2013/0342138 A1    Dec. 26, 2013

(51) Int. Cl.
| H02P 27/00 | (2006.01) |
| H02M 5/42 | (2006.01) |
| H02M 1/12 | (2006.01) |
| H02P 6/00 | (2006.01) |

(52) U.S. Cl.
CPC ............. *H02M 5/42* (2013.01); *H02M 1/126* (2013.01); *H02P 6/002* (2013.01)

(58) Field of Classification Search
CPC ..... H02J 7/345; H02J 9/062; H02M 3/33507; H02M 3/3376; H02P 6/001
USPC ...................................................... 318/400.3
See application file for complete search history.

(56) References Cited

U.S. PATENT DOCUMENTS

2010/0232189 A1* 9/2010 Reilly .............................. 363/23

FOREIGN PATENT DOCUMENTS

| CN | 102447403 A | 5/2012 |
| CN | 202334335 U | 7/2012 |
| FR | 2963509 A1 | 2/2012 |
| JP | 2009225583 A | 10/2009 |

(Continued)

OTHER PUBLICATIONS

Search Report and Written Opinion for corresponding French Application No. 1255734 dated Mar. 20, 2013.

(Continued)

*Primary Examiner* — Karen Masih
(74) *Attorney, Agent, or Firm* — Parks Wood LLC

(57) ABSTRACT

A power supply system for supplying electrical power to a load is capable of delivering an output voltage to the load from an input voltage coming from an electric power network. The power supply system includes: at least two input terminals and at least two output terminals, the input terminals being adapted to be connected to the electric power network and the output terminals being adapted to be connected to the load, a converter capable of converting the input voltage into the output voltage, the converter being connected between the input terminals and the output terminals, and a device for limiting the homopolar current that is likely to flow between the electric power network and the load. The device for limiting the homopolar current comprises a transformer connected in parallel with respect to the converter, between the input terminals and the output terminals, the transformer having a first electromagnetic coil and a second electromagnetic coil.

12 Claims, 2 Drawing Sheets

(56) References Cited

FOREIGN PATENT DOCUMENTS

| WO | 2009/013996 | A1 | 1/2009 |
| WO | 2009013996 | A1 | 1/2009 |

OTHER PUBLICATIONS

EP Search Report issued in connection with corresponding EP Patent Application No. 13171979.1 dated Oct. 24, 2013.

\* cited by examiner

POWER SUPPLY SYSTEM, COMPRISING A CONVERTER CONNECTED TO A NETWORK AND A TRANSFORMER CONNECTED IN PARALLEL RELATIVE TO THE CONVERTER TO LIMIT THE HOMOPOLAR CURRENT, AND A DRIVE CHAIN COMPRISING SUCH A POWER SUPPLY SYSTEM

CROSS-REFERENCE TO RELATED APPLICATIONS

This application claims priority under 35 USC §119 to French patent application FR 12 55734, filed Jun. 19, 2012, which is incorporated herein by reference in its entirety.

BACKGROUND

The present invention relates to a system for supplying electrical power to load, the power supply system being capable of delivering an output voltage to the load, from an input voltage coming from an electric power network, the power supply system including:
- at least two input terminals and at least two output terminals, the input terminals being adapted to be connected to the electric power network and the output terminals being adapted to be connected to the load,
- a converter capable of converting the input voltage into the output voltage, the converter being connected between the input terminals and the output terminals, and
- a device for limiting the homopolar current that is likely to flow between the electric power network and the load.

The invention also relates to a drive chain capable of being connected to an electrical network, comprising an electrical machine and such a power supply system of the electrical machine.

The invention is applicable to power supply systems intended to be connected to an AC network or indeed to a DC network. The invention is applicable to power supply systems capable of delivering to the load an AC voltage or a direct current voltage.

From the document FR 2963509 A1, a power supply system of the aforementioned type is known. The power supply system includes a three phase rectifier connected to a three phase power supply network and a three phase inverter connected to the output of the rectifier, the inverter being adapted to deliver a three phase voltage to a load. The rectifier and the inverter are connected to each other by means of a DC bus, and the system further comprises a device for limiting the homopolar current that is likely to flow between the network and the load.

The rectifier includes controllable electronic switches capable of converting the three-phase alternating current supplied by the power network into a direct current delivered at the output of the rectifier, the switches being controlled by a control device capable of sending them control signals to said switches. The control device is capable of limiting the absolute value of the homopolar voltage to a value less than or equal to one sixth of that of the direct current bus voltage.

However, such a power supply system is necessarily connected to an AC network, and the homopolar current, although limited, sometimes has a relatively large value.

The object of the invention is therefore to provide a power supply system that makes it possible to further limit the homopolar current likely to be fed into the network.

To this end, the invention relates to a power supply system of the aforementioned type, wherein the device for limiting the homopolar current comprises a transformer connected in parallel with respect to the converter, between the input terminals and the output terminals, the transformer having a first electromagnetic coil and a second electromagnetic coil.

According to other advantageous aspects of the invention, the power supply system consists of one or more of the following characteristics, taken individually or in accordance with any technically possible combinations:
- the first electromagnetic coil is connected between the output terminals and an electrical ground, and the second electromagnetic coil is connected between the input terminals and the electrical ground, the first coil and the second coil having the same direction of coil winding between the respective terminals and the electrical ground;
- the limiting device further comprises at least a first passive element, the or each first passive element being connected between the transformer and a corresponding output terminal;
- the limiting device further comprises at least one second passive element, the or each second passive element being connected between the transformer and a corresponding input terminal,
- the electric power network is an AC network, and the converter is intended to be connected to the AC network without the presence of a transformer between the AC network and the said converter,
- the converter is an AC-AC converter intended to be connected to an AC network, the AC-AC converter being capable of converting an AC input voltage, coming from the AC network, to an AC output voltage; and
- the AC-AC converter comprises a voltage rectifier adapted to be connected to the AC network and a voltage inverter connected to the output of the voltage rectifier.

The invention also relates to a drive chain adapted to be connected to an electric power network, the drive chain comprising a load, such as an electrical machine, and a power supply system for the electrical machine, wherein the power supply system is as defined here above.

According to other advantageous aspects of the invention, the drive chain includes one or more of the following characteristic features, taken individually or in accordance with any technically possible combinations:
- the transformer has a transformation ratio between the second electromagnetic coil and the first electromagnetic coil, the or each first passive element has a first impedance, the or each second passive element has a second impedance, and the first and second impedances satisfy the following equation:

$$Z1 + K^2 \times Z2 = (K-1) \times Z_L$$

where Z1 and Z2 represent respectively the first and second impedances,
K is the transformation ratio, and
$Z_L$ represents the impedance of the load relative to an electrical ground;
- the transformation ratio (K) of the transformer (36) satisfies the following equality condition:

$$K = 1 + \sqrt{2}; \text{ and}$$

- the value of the first impedance is equal to the value of the second impedance, the value of first and second impedances being preferably defined by using the following equality condition:

$$Z1 = Z2 = \frac{1}{2 \times (1 + \sqrt{2})} \times Z_L;$$

These characteristic features and advantages of the invention will become apparent upon reading the description which follows, given by way of non limiting example, and with reference being made to the accompanying drawings.

DETAILED DESCRIPTION

Figure 1:
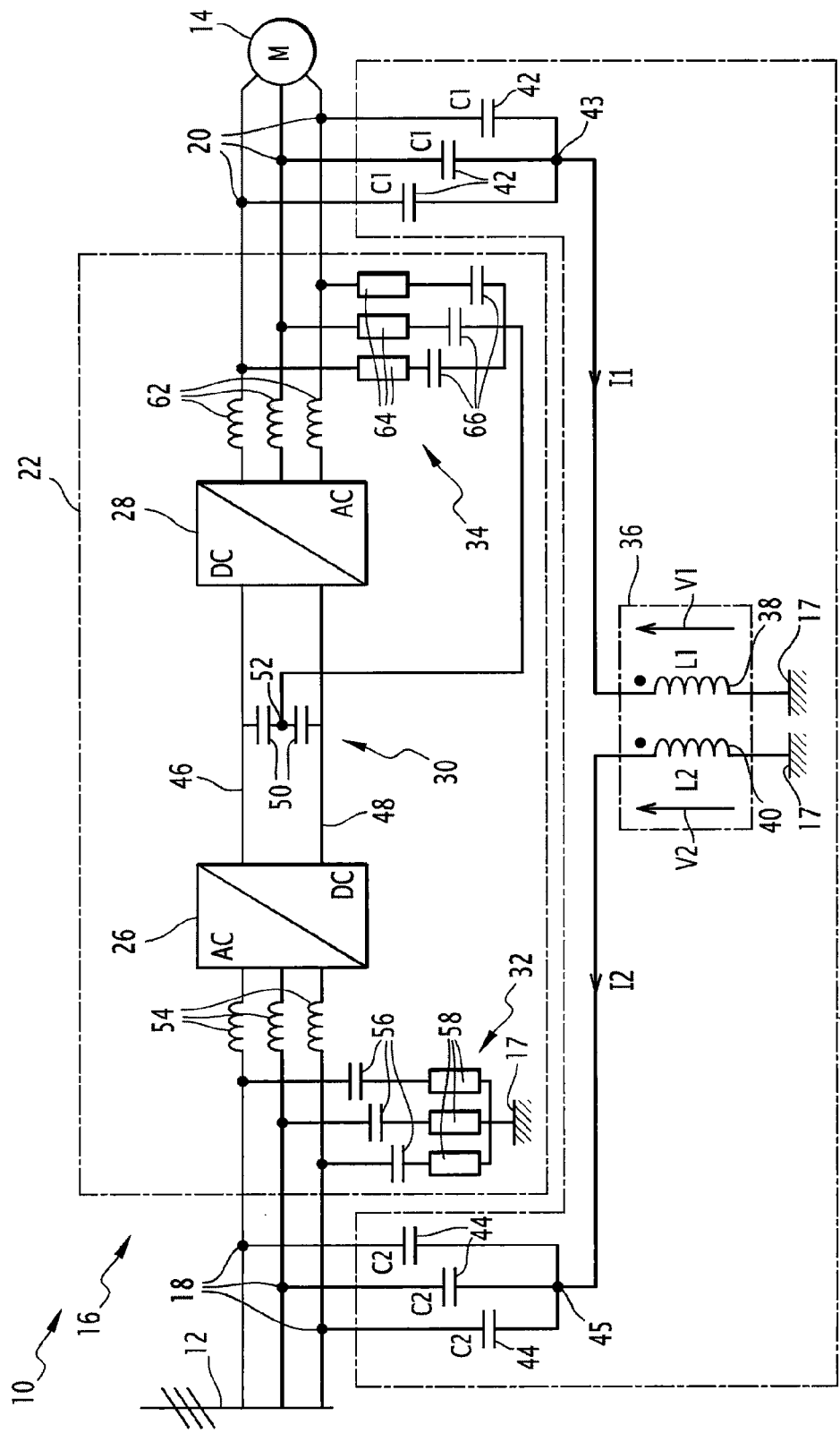
FIG. 1 is a circuit diagram of a drive chain according to the invention.

In FIG. 1, a drive chain 10, connected to an electric power network 12 comprises a load 14 and a system 16 for supplying the load with electric current.

The electric power network 12 is, for example an AC power network. In the embodiment in FIG. 1, the electric power 12 is a three phase network. By way of a variant, the electric power network 12 is a DC power network.

The Load 14 has an impedance $Z_L$ relative to an electrical ground 17, such as a capacitance $C_L$. In the exemplary embodiment in FIG. 1, the load 14 includes an electrical machine, such as a three-phase electric motor. The electric motor 14 is, for example, a synchronous motor. Alternatively, the motor 14 is an asynchronous motor.

The power supply system 16 is capable of delivering an output voltage to the load 14 from an input voltage from the electric power network 12.

The power supply system 16 consists of input terminals 18, output terminals 20, a converter 22 connected between the input terminals 18 and the output terminals 20 and capable of converting the input voltage into the output voltage, and a device 24 for limiting the homopolar current that is likely to flow between the electric power network 12 and the load 14.

When the input voltage and/or the output voltage is a multiphase voltage having P phase(s), the power supply system comprises an input terminal 18 for each phase and/or an output terminal 20 for each phase. By way of a variant, when the input voltage and/or the output voltage is a direct current DC voltage, the power supply system 16 includes two input terminals 18 and/or two output terminals 20.

The input terminals 18 are intended to be connected to the electric power network 12, and the output terminals 20 are intended to be connected to the load 14.

The converter 22 is intended to be connected to the electric power network 12 without the presence of a transformer between the electric power network 12 and said converter 22 (also referred to as Transformerless Converter), when the electric power network 12 is an AC network.

In the exemplary embodiment in FIG. 1, the converter 22 is an AC-AC converter capable of converting the input AC voltage coming from the AC network 12 to the output AC voltage.

The AC-AC converter 22 has a voltage rectifier 26 that is capable of being connected to the AC network 12 and a voltage inverter 28 connected to the output of the voltage rectifier via a direct current DC bus 30.

Additionally, the AC-AC converter 22 includes an input filtre 32, such as a sinusoidal filtre, connected between the network 12 and the voltage rectifier 26, and an output filtre 34, such as a dV/dT filtre, connected between the voltage inverter 28 and the output terminals 20.

The device for limiting the homopolar current 24 comprises a transformer 36, connected in parallel with respect to the converter 22, between the input terminals 18 and the output terminals 20, the transformer 36 having a first electromagnetic coil 38 and a second electromagnetic coil 40.

In addition, the limiting device 24 comprises at least a first passive element 42, the or each first passive element 42 being connected between the transformer 36 and a corresponding output terminal 20.

In the exemplary embodiment in FIG. 1, the output voltage is a three phase voltage, the power supply system 16 includes three output terminals 20 and the limiting device 24 thus includes three first passive elements 42. The three first passive elements 42 are, on the one hand, connected to a corresponding output terminal 20, and on the other hand, connected to each other in a first common point 43.

In addition, the limiting device 22 comprises at least one second passive element 44, the or each second passive element 44 being connected between the transformer 36 and a corresponding input terminal 18.

In the exemplary embodiment in FIG. 1, the input voltage is a three phase voltage, the power supply system 16 includes three input terminals 18, and the limiting device 24 thus includes three second passive elements 44. The three second passive elements 44 are, on the one hand, connected to a corresponding input terminal 18, and on the other hand, connected to each other in a second common point 45.

The voltage rectifier 26 is known per se, and comprises, for example, the controllable electronic switches, not shown, capable of converting the input AC voltage into a direct current voltage supplied to the direct current bus 30.

In the exemplary embodiment in FIG. 1, the rectifier 26 is a controlled rectifier, also known as AFE (Active Front End). The rectifier 26, for example, has a topology type described as clamped by the neutral point, also known as NPC (Neutral Point Clamped) topology. By way of a variant, the rectifier 26 has a topology type described as piloted by the neutral point, also called NPP (Neutral Point Piloted) topology.

The voltage inverter 28 is known per se, and includes, for example, controllable electronic switches, not shown, capable of converting the direct current DC voltage coming from the direct current DC bus 30 to the output AC voltage.

The inverter 28 has, for example, has a topology type described as clamped by the neutral point, also known as NPC topology. By way of a variant, the inverter 28 has a topology type described as piloted by the neutral point, also called NPP topology.

The direct current bus 30 has a positive conductor 46 and negative conductor 48 of direct current flow between the rectifier 26 and the inverter 28. The direct current DC bus 30 includes two capacitors 50 connected in series between the positive conductor 46 and the negative conductor 48, the capacitors 50 being connected to each other by a mid point 52.

The input Sinusoidal filtre 32 is known per se, and comprises, for example, three input electromagnetic coils 54, each being connected between a respective input terminal 18 and the rectifier 26, as well as three input capacitors 56 and three input resistors 58, each input capacitor 56 being connected in series with an input resistor 58 between a respective input terminal 18 and the electrical ground 17.

The output filtre 34 includes three output electromagnetic coils 62, each being connected between the output of the inverter 28 and a respective output terminal 20, as well as three output resistors 64 and three output capacitors 66, each output resistance 64 being connected in series with a corresponding output capacitor 66, between a respective output terminal 20 and the midpoint 52 connecting the two capacitors 50 of the direct current bus.

The transformer 36 has a transformation ratio K between the second electromagnetic coil 40 and the first electromagnetic coil 38.

The first electromagnetic coil 38 is connected between the output terminals 20 and the electrical ground 17. In the exemplary embodiment in FIG. 1, the first electromagnetic coil 38 is connected between the first common point 43 and the electrical ground 17.

The first electromagnetic coil 38 is capable of having flow through it a first current I1 and has a first voltage V1 at its ends.

The second electromagnetic coil 40 is connected between the input terminal 18 and the electrical ground 17. In the exemplary embodiment in FIG. 1, the second electromagnetic coil 40 is connected between the second common point 45 and the electrical ground 17.

The second electromagnetic coil 40 is capable of having flow through it a second current I2 and has a second voltage V2 at its ends.

The first electromagnetic coil 38 and second electromagnetic coil 40 has a same direction of winding between the respective terminals 18, 20 and the electrical ground 17, as shown in FIG. 1.

Each first passive element 42 has a first impedance Z1 and each second passive element 44 has a second impedance Z2. The first and second impedances Z1, Z2 preferably satisfy the following equation:

$$Z1 + K^2 \times Z2 = (K-1) \times Z \quad (1)$$

wherein Z1 and Z2 represent respectively the first and second impedances,

K represents the transformation ratio, and $Z_L$ represents the impedance of the load 14 with respective to the electrical ground 17, the load 14 corresponding, for example, to the electrical machine as well as to the cables connected between the output terminals 20 and the electrical ground 17.

The transformation ratio K is defined in a manner such that the first and second currents I1, I2 satisfy the following equation:

$$I2 = K \times I1 \quad (2)$$

In other words, the transformation ratio K is defined in a manner such that the first and second voltages V1, V2 satisfy the following equation:

$$V1 = K \times V2 \quad (3)$$

The equation (1) is obtained by imposing the condition that the homopolar current fed into the electric power network 12 be substantially nil, the goal of the device for limiting the homopolar current 24 is to eliminate the homopolar current. In other words, the second current I2 that is likely to flow through the second electromagnetic coil 40 in the direction of the input terminals 18 is substantially equal to the sum of the first current I1 that is likely to flow through the first electromagnetic coil 38 from the output terminals 20 and the homopolar current likely to flow in the impedance $Z_L$.

The transformation ratio K of the transformer 36 preferably satisfies the following equality condition:

$$K = 1 + \sqrt{2} \quad (4)$$

in order to maximise the values of the first and second impedances Z1, Z2.

The value of the first impedance Z1 is, for example, equal to the value of the second impedance Z2. The values of the first and second impedances Z1, Z2 are then preferably defined by way of using the following equality condition:

$$Z1 = Z2 = \frac{1}{2 \times (1 + \sqrt{2})} \times Z_L \quad (5)$$

In the exemplary embodiment in FIG. 1, each first passive element 42 is a capacitor and each 44 second passive element is a capacitor.

Each first capacitor 42 has a first capacitance C1 and each second capacitor 44 has a second capacitance C2. The first and second capacitances C1 C2 preferably satisfy the following equation:

$$\frac{1}{C1} + \frac{K^2}{C2} = (K-1) \times \frac{1}{C_L} \quad (6)$$

where C1 and C2 represent the first and second capacitances,

K is the transformation ratio, and $C_L$ represents the capacitance of the load 14 relative to the electrical ground 17, the load 14 corresponding, for example, to the electrical machine as well as to the cables connected between the output terminals 20 and electrical ground 17.

The equation (6) is obtained in an analogous manner, by imposing the condition that the homopolar current fed into the electric power network 12 be substantially nil. In other words, the second current I2 that is likely to flow through the second electromagnetic coil 40 in the direction of the input terminals 18 is substantially equal to the sum of the first current I1 that is likely to flow through the first electromagnetic coil 38 from the output terminals 20 and the homopolar current likely to flow in the capacitance $C_L$.

In an analogous manner, the transformation ratio K of the transformer 36 preferably, verifies the equality condition of the equation (2) in order to minimise the values of the first and second capacitances C1, C2.

The value of the first capacitance C1 is, for example, equal to the value of the second capacitance C2. The values of the first and second capacitances C1, C2 are then preferably defined by using the following equality condition:

$$C1 = C2 = 2 \times (1 + \sqrt{2}) \times C_L \quad (7)$$

In the event the transformer 36 has a leakage inductance $L_{leakage}$ of significant value, then this leakage inductance $L_{leakage}$ will be included in the first or second impedance Z1, Z2. If necessary, the load 14 will include an electromagnetic coil in a manner such that the impedance of the load $Z_L$ still satisfies the equation (1).

During operation of the power supply system 16 according to the invention, the device for limiting homopolar current 24 severely limits the homopolar current, or even eliminates it, by feeding back the second current I2 to the input terminals 18 opposing the homopolar current that is likely to flow between the electric power network 12 and the load 14.

In other words, the transformer 36 connected between the output terminals 20 and the input terminals 18 in parallel with respect to the converter 22, forms a loop for the looping back of the current intended to compensate for the homopolar current that is likely to flow through the converter 22 between the electric power network 12 and the load 14.

The limiting device 24 thus is intended to reduce, or even to eliminate, the homopolar current that is likely to be fed back to the electric power network 12 from the load 14.

It is thus conceivable that the power supply system 16 according to the invention makes it possible to further limit the homopolar current that is likely to flow between the network and the load.

The person skilled in the art will observe that the limiting device 24 is applicable, without special modification and in an analogous manner, to the case where the converter 22 is an AC-DC converter, or indeed a DC-AC converter, or even a DC-DC converter. The number of first passive elements 42 is equal to the number of output terminals 20, the or each first passive element 42 being connected to a corresponding output terminal 20. The number of second passive elements 44 is equal to the number of input terminals 18, the or each second passive element 44 being connected to a corresponding input terminal 18.

Figure 2:
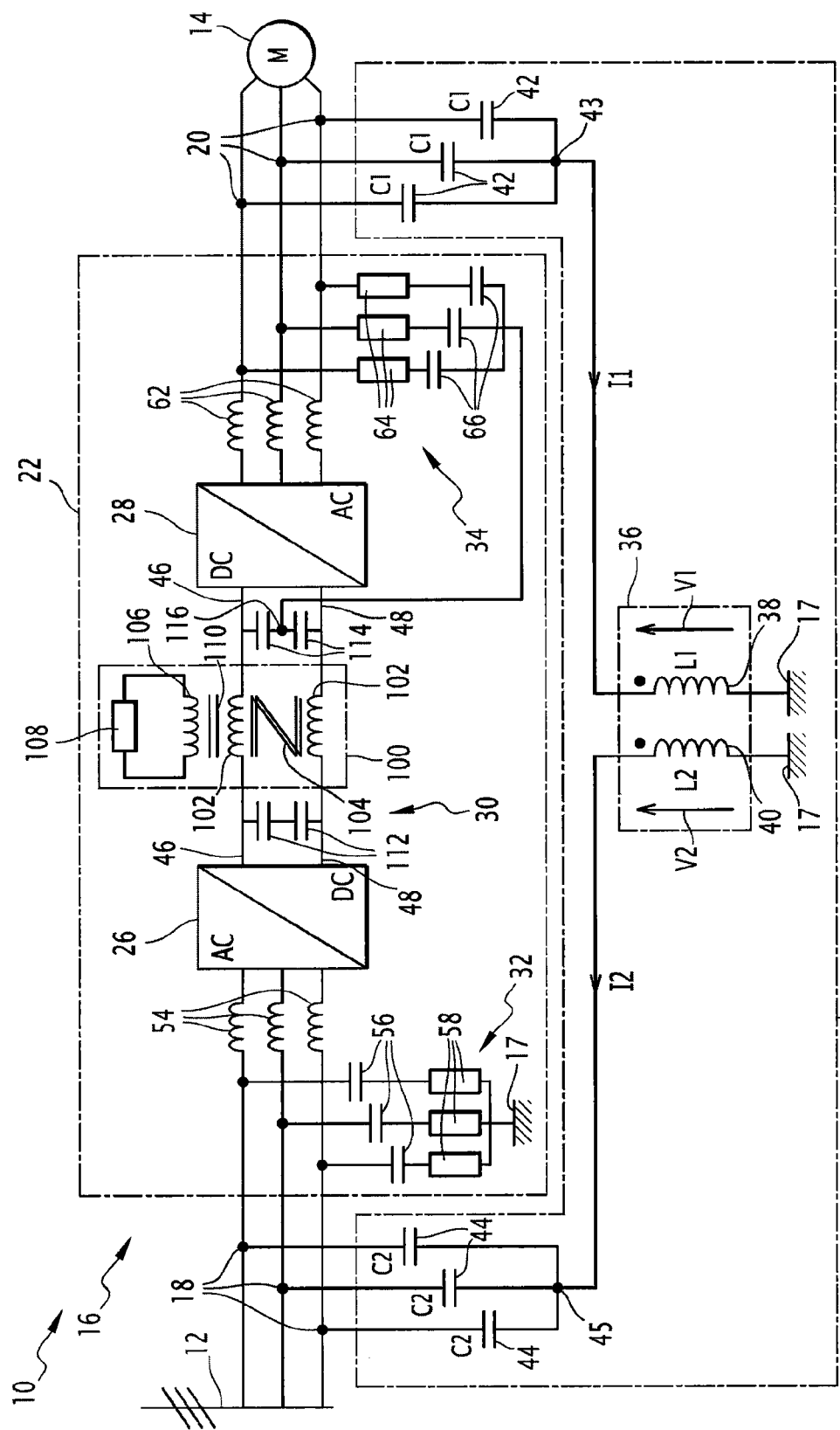
FIG. 2 is a view that is similar to that in FIG. 1 according to a second embodiment of the invention.

FIG. 2 illustrates a second embodiment of the invention for which the elements that are similar to the first embodiment described here above, are identified by the same reference numerals, and are not described again.

According to the second embodiment, the converter 22 also includes a member 100 for limiting the common mode current that is likely to flow between the electric power network 12 and the load 14, the member for limiting the common mode current 100, being disposed between the voltage rectifier 26 and the voltage inverter 28.

The current limiting member 100 includes a primary electromagnetic winding 102 for each of the two polarities of the direct current that is likely to flow between the rectifier 26 and the inverter 28, and a core 104 for magnetic coupling of the two primary windings 102. The current limiting member 100 also includes a secondary winding 106 connected in series with a resistor 108, also called damping resistor, and a second magnetic core 110 for coupling of the secondary winding 106 with the primary windings 102.

By way of a variant, the limiting member 100 comprises a single magnetic core for coupling of the two primary windings and the secondary coil winding.

By way of a variant, the damping resistor 108 is connected directly in parallel with the primary electromagnetic winding 102. By way of another variant, the damping resistor 108 is formed by the resistance equivalent to the iron core losses of the core.

The direct current bus 30 comprises first padding capacitors 112 arranged between the voltage rectifier 26 and the limiting member 100, and connected in series between the positive conductor 46 and the negative conductor 48.

The direct current bus 30 comprises second padding capacitors 114 arranged between the limiting member 100 and the inverter 28, the second padding capacitors 114 being connected in series between the positive conductor 46 and the negative conductor 48 and connected to each other by a mid point 116. The mid point 116 is connected to the output filtre 34.

The functioning of this second embodiment is identical to that of the first embodiment in regards to the limiting device for limiting the homopolar current 24 and is not described again.

The common mode current limiting member 100 also makes it possible to reduce the common mode current that is likely to flow through the converter 22 between the electric power network 12 and the load 14.

The other advantages of this second embodiment are identical to those of the first embodiment, and are not described again.

It may thus be appreciated that the power supply system 16 according to the invention makes it possible to further limit the homopolar current that is likely to be fed into the network.

The invention claimed is:

1. A power supply system for supplying electrical power to a load, the power supply system being capable of delivering an output voltage to the load from an input voltage coming from an electric power network, the power supply system including:

at least two input terminals and at least two output terminals, the input terminals being configured to connect to the electric power network, and the output terminals configured to connect to the load;

a converter configured to convert the input voltage into the output voltage, the converter being connected between the input terminals and the output terminals;

a device configured to limit a homopolar current that is likely to flow between the electric power network and the load;

wherein the device includes a transformer connected in parallel with respect to the converter, the transformer having a first electromagnetic coil connected to the output terminals and an electrical ground and a second electromagnetic coil connected to the input terminals and the electrical ground, the first and second electromagnetic coils having the same winding direction between their respective terminals and the electrical ground.

2. The power supply system according to claim 1, wherein the device further includes at least a first passive element, the or each first passive element being connected between the transformer and a corresponding output terminal.

3. The power supply system according to claim 1, wherein the device further comprises at least one second passive element, the or each second passive element being connected between the transformer and a corresponding input terminal.

4. The power supply system according to claim 1, wherein the electric power network is an AC network, and the converter is configured to connect to the AC network without the presence of a transformer between the AC network and the said converter.

5. The power supply system according to claim 1, wherein the converter is an AC-AC converter configured to connect to an AC network, the AC-AC converter being capable of converting an AC input voltage coming from the AC network to an AC output voltage.

6. The power supply system according to claim 5, wherein the AC-AC converter comprises a voltage rectifier adapted to be connected to the AC network and a voltage inverter connected to an output of the voltage rectifier.

7. A drive chain, for connecting to an electric power network, the drive train comprising:

an electrical machine;

a power supply system configured to supply power to the electrical machine, the power supply system including:

at least two input terminals and at least two output terminals, the input terminals configured to connect to the electric power network, and the output terminals configured to connect to the electrical machine;

a converter connected between the input terminals and the output terminals; and a device configured to limit a homopolar current flowing between the electric power network and the load;

wherein the device includes a transformer connected in parallel with respect to the converter, the transformer having a first coil connected to the output terminals and an electrical ground and a second coil connected to the input terminals and the electrical ground, the first and second coils having the same winding direction between their respective terminals and the electrical ground.

8. The drive chain according to claim 7, wherein the device further includes at least a first passive element and at least a second passive element, the at least first passive element being connected between the transformer and a corresponding output terminal, and the at least second passive element being connected between the transformer and a corresponding input terminal.

9. The drive chain according to claim 8, wherein the transformer has a transformation ratio that satisfies the following equality condition:

$$K = 1 + \sqrt{2}.$$

10. The power system according to claim 8, wherein the transformer comprises a transformation ratio between the second electromagnetic coil and the first electromagnetic coil, the at least first passive element has a first impedance, the at least second passive element has a second impedance, and the first and second impedances satisfy the following equation:

$$Z1 + K^2 \times Z2 = (K-1) \times Z_L$$

where $Z1$ and $Z2$ represent respectively the first and second impedances,

K is the transformation ratio, and $Z_L$ represents the impedance of the load relative to an electrical ground.

11. The drive chain according to claim 10, wherein the first impedance is substantially equal to the second impedance.

12. The drive train according to claim 11, wherein the first and second impedances satisfy the following equality condition:

$$Z1 = Z2 = \frac{1}{2 \times (1 + \sqrt{2})} \times Z_L.$$

* * * * *